United States Patent [19]

Gram

[11] 4,319,900
[45] Mar. 16, 1982

[54] LIQUEFACTOR

[75] Inventor: Anker Gram, North Vancouver, Canada

[73] Assignee: Cleanair Combustion Systems Ltd., British Columbia, Canada

[21] Appl. No.: 137,679

[22] Filed: Apr. 7, 1980

Related U.S. Application Data

[63] Continuation of Ser. No. 22,665, Mar. 22, 1979, abandoned, which is a continuation-in-part of Ser. No. 838,195, Sep. 30, 1977, abandoned.

[51] Int. Cl.³ ................................................ F25J 3/00
[52] U.S. Cl. .......................................... 62/42; 62/18; 62/23; 62/40; 55/75
[58] Field of Search ............................ 55/75, 179–181; 62/18, 23, 42, 40

[56] References Cited

U.S. PATENT DOCUMENTS

| | | | |
|---|---|---|---|
| 3,023,841 | 3/1962 | Milton et al. | 62/18 |
| 3,242,681 | 3/1966 | Shaievitz | 62/23 |
| 3,554,904 | 1/1971 | Humphries | 62/18 |
| 3,780,534 | 12/1973 | Lofredo et al. | 62/18 |
| 3,894,856 | 7/1975 | Lofredo et al. | 62/18 |
| 4,012,205 | 3/1977 | Macriss et al. | 55/75 |

Primary Examiner—Norman Yudkoff
Attorney, Agent, or Firm—Klarquist, Sparkman, Campbell, Leigh, Whinston & Dellett

[57] ABSTRACT

An apparatus for purifying and liquifying an input gas containing natural gas and air. The apparatus comprises a plurality of molecular sieve assemblies operatable to clean the gas on a gas cleaning mode and to be regenerated on a heating mode and a cooling mode. A first assembly cleans the gas while a second sieve assembly is being regenerated. A three position valve associated with each molecular sieve assembly changes the modes of the sieve assemblies. A two position valve supplies hot air for heating the sieve assemblies during the heating mode, supplies cool air for cooling the sieve assemblies when the sieve assemblies are at a temperature above 400° F. and supplies cool gas for cooling the sieve assemblies when the sieve assemblies are at a temperature below 400° F.

29 Claims, 7 Drawing Figures

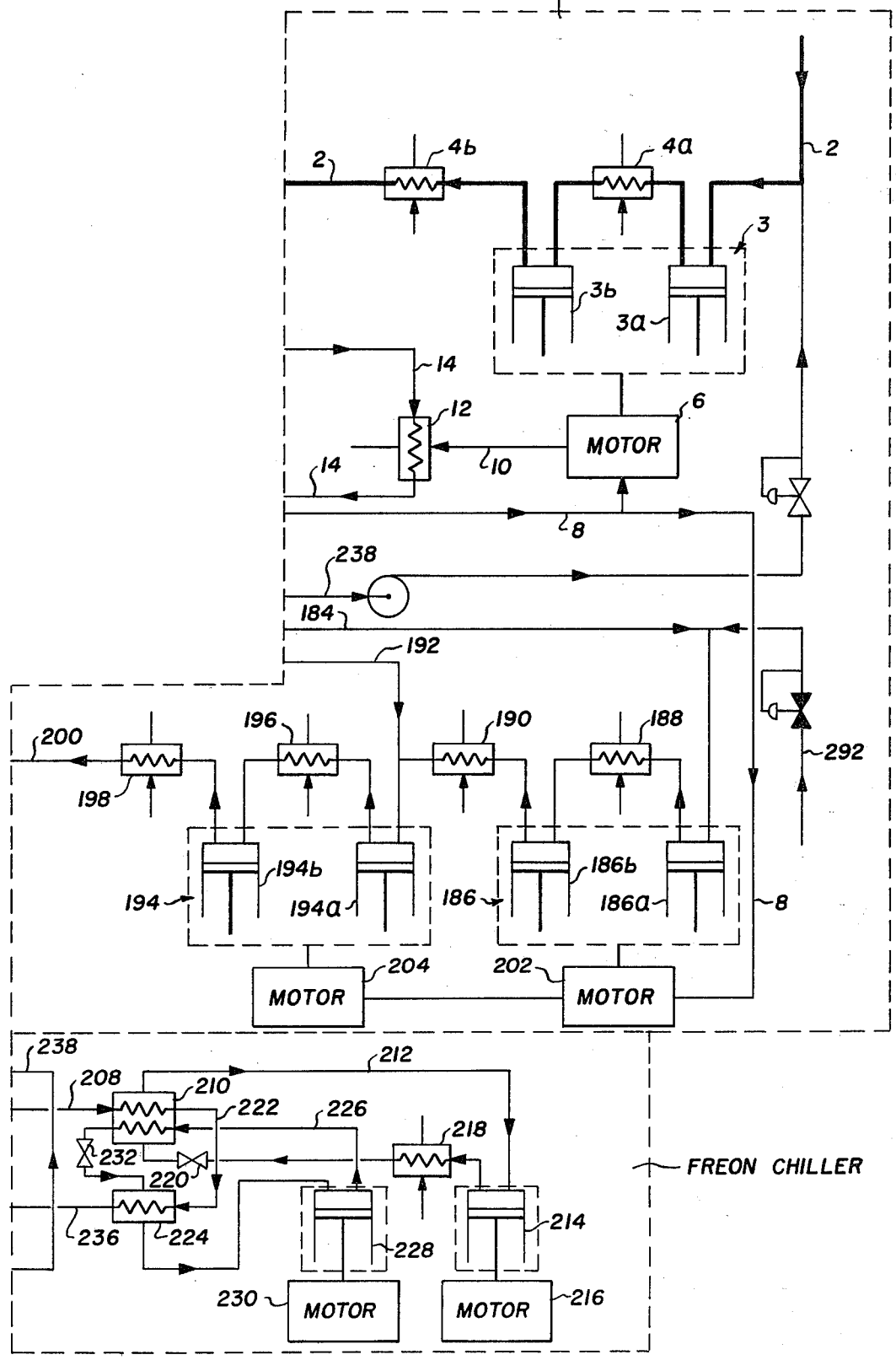

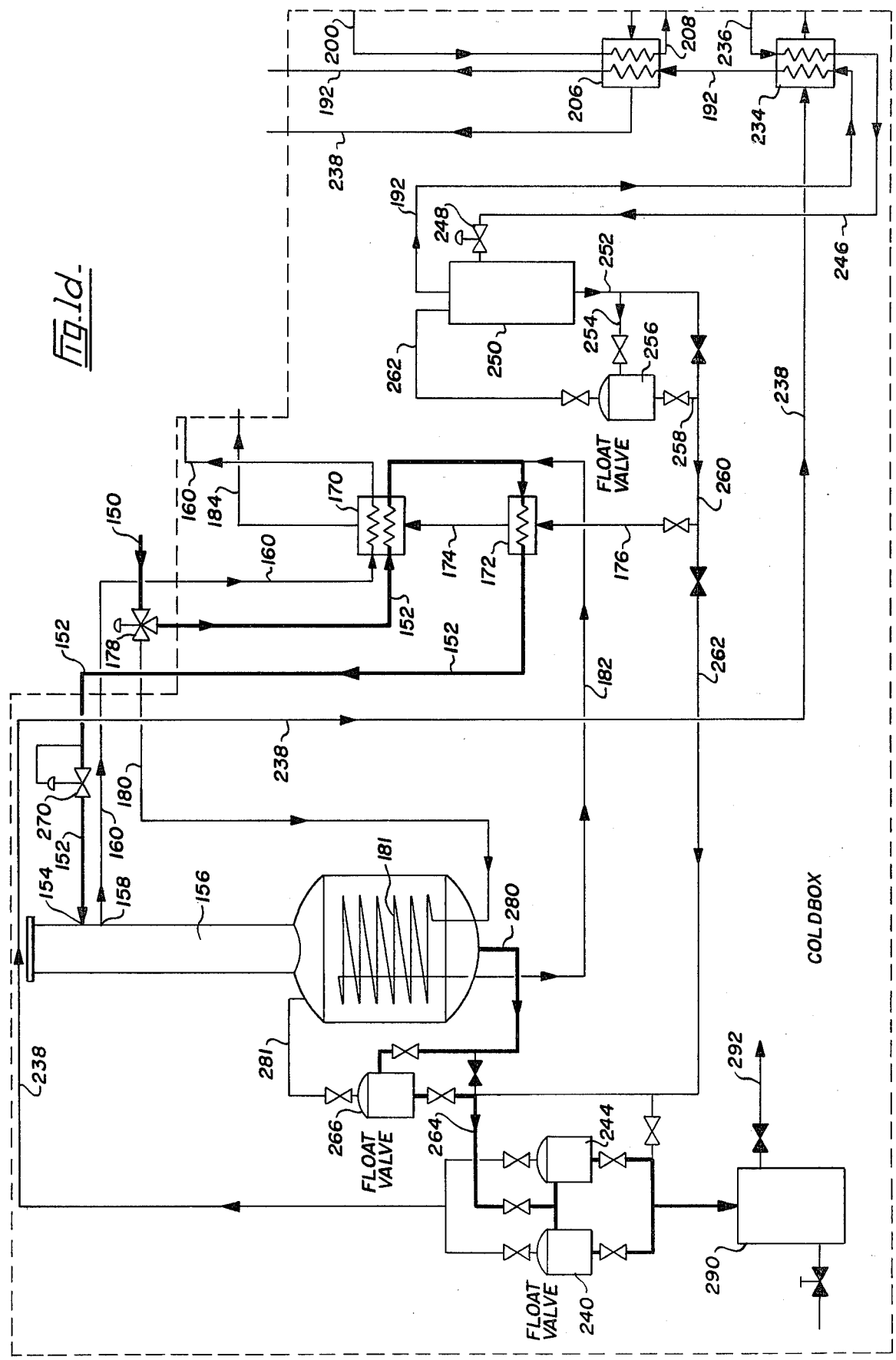

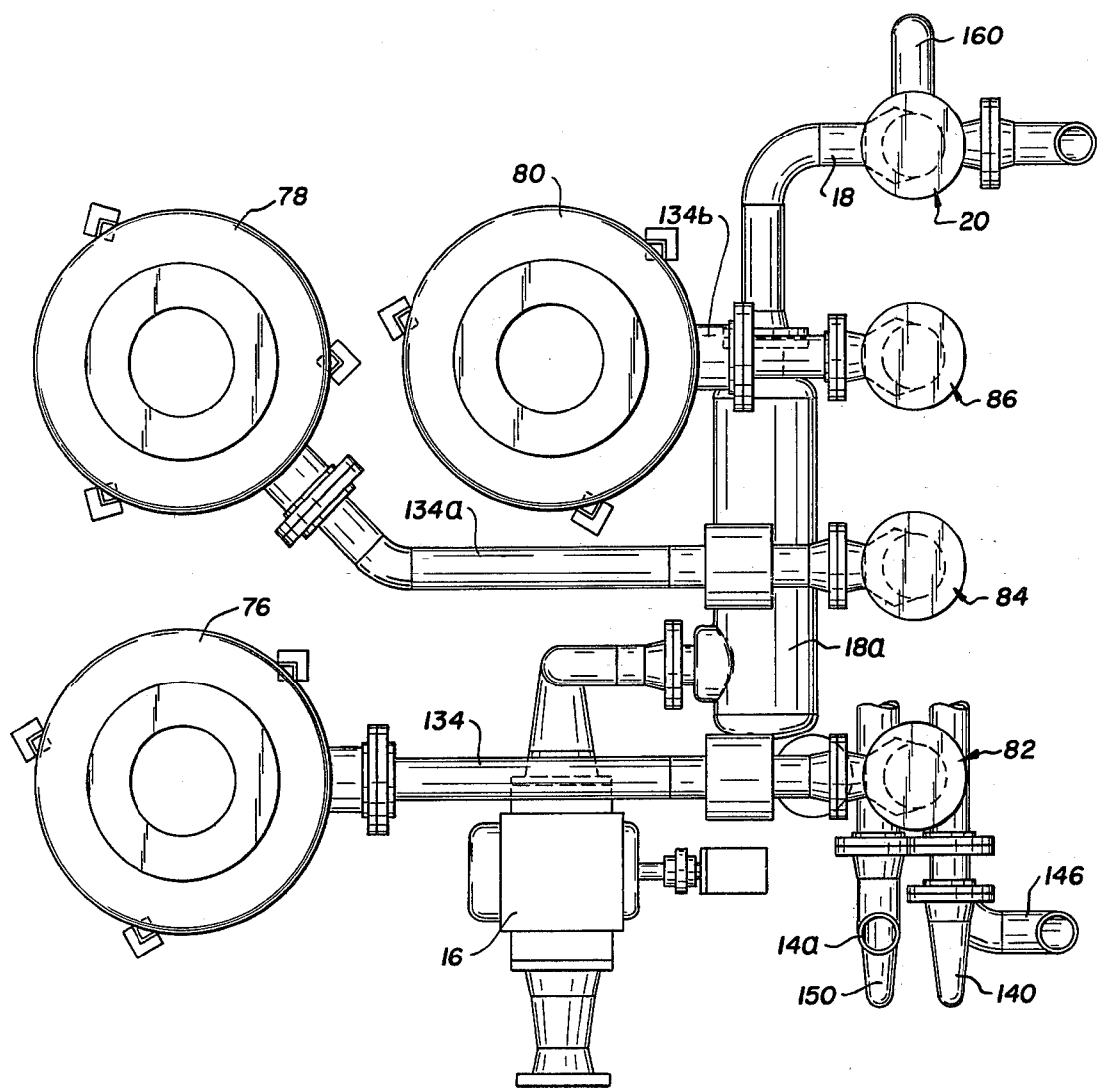

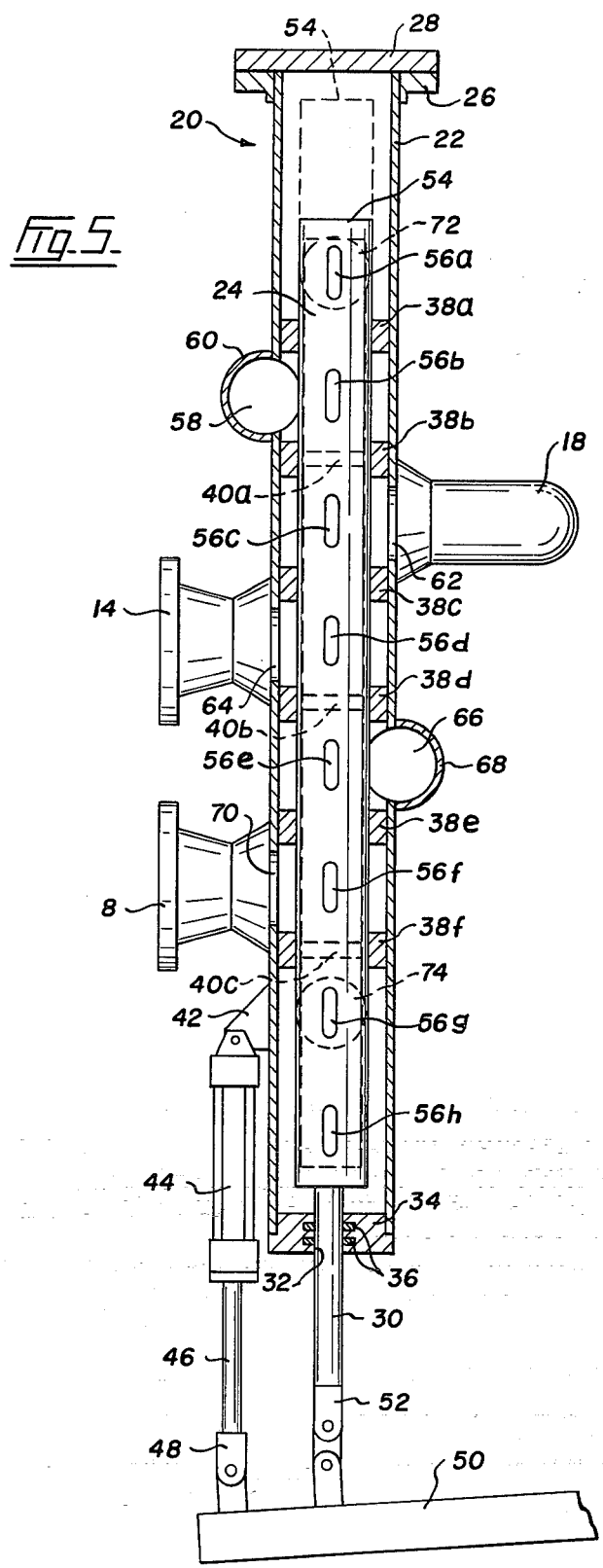

LIQUEFACTOR

RELATED APPLICATION

This is a continuation of application Ser. No. 022,665, filed Mar. 22, 1979, now abandoned which is a continuation-in-part of my co-pending U.S. patent application Ser. No. 838,195, filed Sept. 30, 1977 abandoned.

BACKGROUND OF THE INVENTION

This invention relates to an apparatus for purifying and liquifying natural gas.

When longwall mining techniques are used, large volumes of mine gas containing natural gas and air are released as the overburden collapses behind the advancing mining machinery. The practice has been to drill holes from the surface and siphon off the gas through these holes. When this gas is so disposed of, large volumes of potentially useful natural gas are destroyed. Prior art gas liquifiers have not been of the self-contained and portable nature necessary for easy transportation to the mine or other location where it is desired to liquify gas.

One reason for this has been the relatively complex system of valving and piping used to change the molecular sieve assemblies from the cleaning mode to the regenerating mode. This may be seen in U.S. Pat. No. 3,087,291 to Jackson where six valves are used for changing the modes of operation of two seive assemblies of a gas purifying apparatus.

Another problem involves providing a suitable source for gas to heat and cool the molecular sieve assemblies during regeneration. In some liquifying apparatuses, natural gas has been burned to heat the gas for heating the sieve assemblies. However, this cannot be safely done near the liquifying apparatus itself. Consequently, the heater must be placed a distance away from the liquifying apparatus and this prevents the apparatus from being packaged in a self-contained unit. One solution to the problem has been to heat the regeneration gas with exhaust gases from motors used to power compressors of the liquifying apparatus. For example, this may be seen in U.S. Pat. Nos. 3,894,856 and 3,780,534 to Lafredo.

If natural gas is used to regenerate the sieve assemblies, and if the gas contains even a trace of air, the sieve assemblies cannot be regenerated properly. If the gas or sieve assemblies are at a temperature above 400° F., catalytic burning of the air and natural gas results, producing carbon dioxide and water to contaminate the molecular sieve assemblies. One solution to this problem is to provide a high degree of separation between the air and natural gas from the original input gas. However, this requires a relatively large and complex separation tower to provide the high degree of separation.

Other patents which may be considered relevant to this invention are U.S. Pat. No. 3,554,904 to Humphries, U.S. Pat. No. 2,704,274 to Allison and U.S. Pat. No. 3,680,944 to Knapp.

SUMMARY OF THE INVENTION

This invention provides an apparatus for purifying an input gas containing natural gas and air. The apparatus comprises a plurality of molecular seive assemblies operable to clean the gas on a gas cleaning mode and to be regenerated on a heating mode and a cooling mode. A first sieve assembly cleans the gas while a second sieve assembly is being regenerated. Means is provided for cyclically changing the modes of the sieve assemblies. Means is provided for supplying hot air for heating the sieve assemblies during the heating mode and for supplying cool gas for cooling the sieve assemblies during the cooling mode.

The means for supplying cool gas may comprise valve means for supplying cool air for cooling the sieve assemblies when the sieve assemblies are above a temperature generally near 400° F. and for supplying a mixture of purified natural gas and air cooling the sieve assemblies when the sieve assemblies are below said temperature.

Preferably, the valve means comprises a two position valve having a first position for operation above said temperature and a second position for operation below said temperature.

The means for cyclically changing may comprise a plurality of three position valves, one three position valve being associated with each molecular sieve assembly.

The apparatus may also include an apparatus for liquifying the gas purified by the molecular sieve assemblies and for separating air from the gas. The apparatus for liquifying comprises at least one compressor powered by a motor fueled by natural gas and a separation tower for separating liquid natural gas and a tower gas containing natural gas and air.

By supplying hot air for heating the sieve assemblies during the heating mode, the need for providing a high degree of separation between natural gas and air is removed and the size and complexity of the separation tower can be reduced to provide a more portable and compact apparatus. The use of cool air for cooling the sieve assemblies when they are at a temperature above 400° F. during the cooling mode also permits this simplification. However, the tower gas containing air and natural gas is not wasted. It is used for cooling the molecular sieve assemblies in the cooling mode when the sieve assemblies are below a temperature of 400° F. and is used as a source of fuel for the compressor motors.

The two position valve provides a simple and effective means of changing the flow of gases and air as required above 400° F. and below 400° F.

The use of three position valves associated with each molecular sieve and a plurality of manifolds connected to the three position valves for cyclically changing the modes of the sieve assemblies greatly simplifies this part of the apparatus. This contributes to the reduced weight, portability, compactness and economy of manufacture.

In drawings which illustrate embodiments of the invention:

FIG. 1a is a schematic diagram of the compressor unit and freon chiller of an apparatus and process for purifying and liquifying mine gas according to an embodiment of the invention;

FIG. 1b is a schematic diagram of the purifying unit of the apparatus of FIG. 1a;

FIG. 1d is a schematic diagram of the cold box for the apparatus and process;

FIG. 2 is a top plan view of the three molecular sieve assemblies, the three position valve associated with each assembly and the two position valve for the apparatus;

FIG. 5 is a front elevational view of the two position valve shown in section.

DESCRIPTION OF THE PREFERRED EMBODIMENTS

Figure 1B:
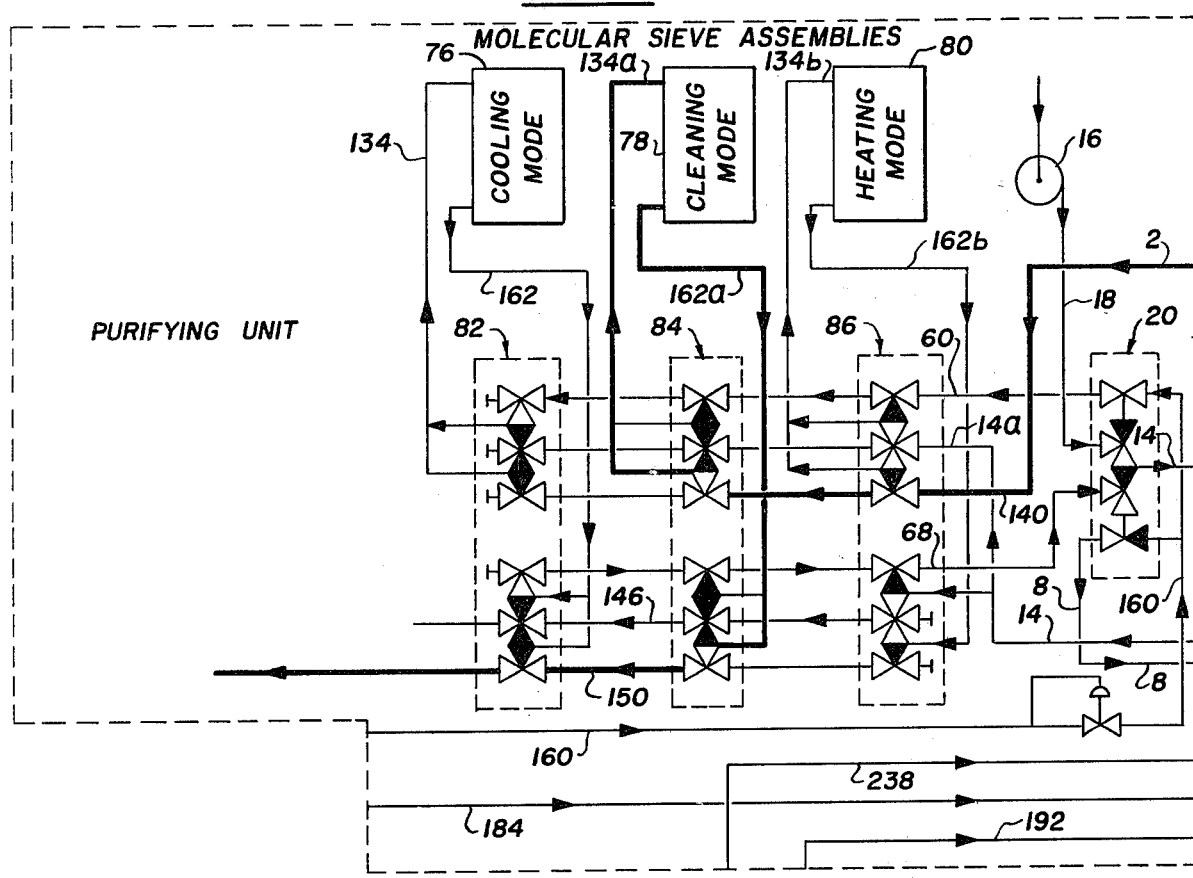

Referring to FIG. 1a, the input mine gas containing natural gas and air enters conduit 2 from a mine drill hole or other suitable source of gas. From conduit 2, the gas is compressed by compressor 3 having two stages 3a and 3b. After each stage, the gas is cooled in aftercoolers 4a and 4b respectively by air.

The compressor 3 is powered by a motor 6 fueled by natural gas flowing to the motor through conduit 8. Exhaust gases from the motor 6 flow through conduit 10 to an exhaust gas heat exchanger 12 where it heats air flowing through heat exchanger conduit 14.

The apparatus includes a source of pressurized air or fan 16 as shown in FIG. 1b. A fan conduit 18 connects the fan 16 to the two position valve 20. The valve 20 is shown in more detail in FIG. 5. The valve 20 has a tubular casing 22 and a tubular stem 24 slidable within the casing. The upper end of the casing 22 is sealed by annular flange 26 and cap 28 bolted thereto. A rod 30 is connected to the lower end of stem 24 and passes slidably through the central aperture 32 of cap 34 at the lower end of casing 22. Seals 36 are provided to prevent a leakage of gas between rod 30 and cap 34. A plurality of annular flurocarbon-coated seals 38a, 38b, 38c, 38d, 38e and 38f are spaced along the stem 24 and connected to the casing 22 by set screws. The interior of stem 24 is divided into four separate portions of bulkheads 40a, 40b, and 40c.

A mounting lug 42 is welded to casing 22 near the bottom thereof. A hydraulic cylinder 44 is pivotally connected to lug 42 by a link pin and has a piston rod 46. Rod 46 has a clevis 48 pivotally connected to lever 50 similar to lever 120 shown in FIG. 3. Rod 30 has a clevis 52 also pivotally connected to lever 50. Consequently, cylinder 44 is operatively connected to rod 30 to raise stem 24 from the first position shown in solid lines in FIG. 5 to a second position, shown in broken lines, where the top end 54 of stem 24 is adjacent cap 28.

Stem 24 has a plurality of stem apertures 56a adjacent top end 54. While only one such aperture is shown in FIG. 5, there are three similar apertures spaced 90° apart about the stem 24. A plurality of similar apertures 56b, 56c, 56d, 56e, 56f, 56g and 56h are spaced-apart along the stem 24.

A plurality of ports are spaced along the casing 22. A cooling gas port 58 communicates with cooling gas conduit or manifold 60. Below port 58, a fan port 62 communicates with fan conduit 18. Heat exchanger port 64 communicates with heat exchanger conduit 14. Heated gas port 66 communicates with heated gas conduit or manifold 68. Fuel port 70 communicates with fuel conduit 8. Casing 22 also has first and second tower gas ports 72 and 74 located near the top and bottom thereof and communicating with tower gas conduit 160 shown in FIG. 4.

Figure 3:
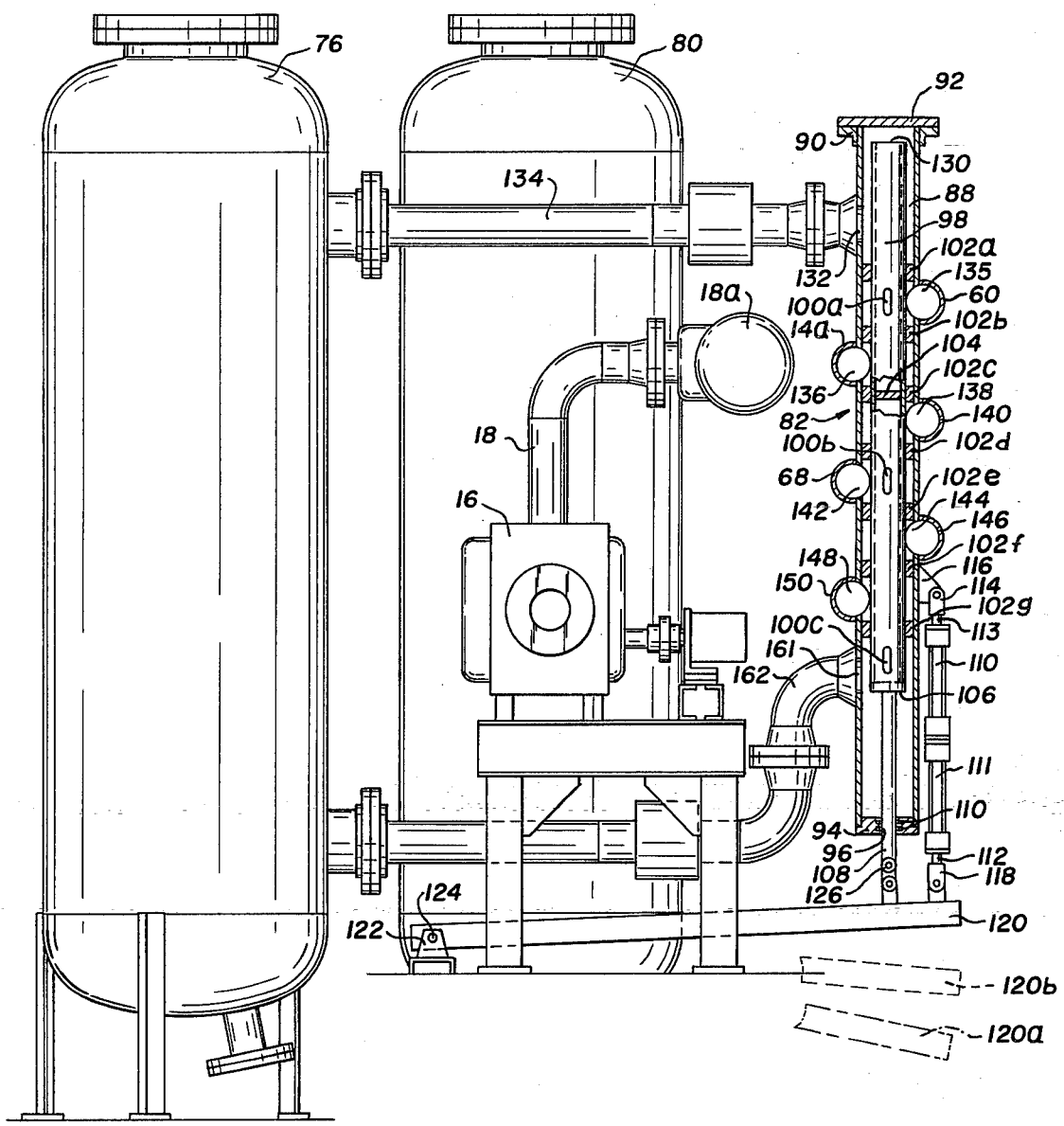
FIG. 3 is side elevational view of the molecular sieve assemblies of FIG. 2 with one three position valve shown in section.

As shown in FIGS. 1b, 2 and 3, the apparatus includes three molecular sieve assemblies 76, 78, and 80. These are containers containing a suitable molecular sieve medium well known in the art for purifying natural gas. As shown, sieve assembly 78 is on a cleaning mode for purifying the mine gas and during which the molecular sieve assembly accumulates impurities. Sieve assemblies 80 and 76 are being regenerated on a heating mode and a cooling mode respectively. After operating on a cleaning mode, a sieve assembly must be rid of accumulated impurities. For this purpose, hot air is passed through the sieve assembly during the heating mode to remove accumulated impurities. After the sieve is heated, it must be cooled during the cooling mode, as shown for sieve assembly 76, before it can resume the cleaning mode.

The apparatus includes means for cyclically changing the modes of the sieve assemblies comprising three position valves 82, 84, and 86 associated with sieve assemblies 76, 78 and 80 respectively. Valves 82 and 86 are identical to valve 82 shown in FIG. 3 and are generally similar to the two position valve 20 shown in FIG. 5. Each three position valve has a tubular casing 88 with an annular flange 90 near the top end which is sealed by a cap 92 bolted thereto. A cap 94 with a central aperture 96 is welded to the bottom end of the casing. The valve has a tubular stem 98 slidable within the casing. The stem 98 has a plurality of stem apertures 100a, 100b, and 100c spaced along the stem for the passage of gas. While there is only a single aperture shown at each position, in fact there are four apertures 100a, four apertures 100b and four apertures 100c, spaced 90° apart around the stem 98.

The three position valves have a plurality of seals 102a, 102b, 102c, 102d, 102e, 102f and 102g connected to the casing 88 by means of set screws. These seals present the leakage of gas between the stem and the casing.

Stem 98 has an interior bulkhead 104 near the center thereof dividing the stem into two sections to permit two separate flows of gases through the stem. A rod 108 is connected to the lower end 106 of the stem and projects slidably through aperture 96 in cap 94. Seals 110 are provided to prevent the leakage of gas past rod 108. A hydraulic cylinder 110 with a piston rod 113 has a clevis 114 pivotally connected to the lug 116 connected to the side of casing 88. A second hydraulic cylinder 111 is connected to the bottom of cylinder 110. A clevis 118 on the end of rod 112 of cylinder 111 is pivotally connected to a first end of lever 120. The second end of lever 120 is pivotally mounted on a pair of spaced-apart lugs 122 by means of pin 124. The bottom end of rod 108 is also pivotally connected to lever 120 adjacent clevis 118 by means of a clevis 126.

Figure 4:
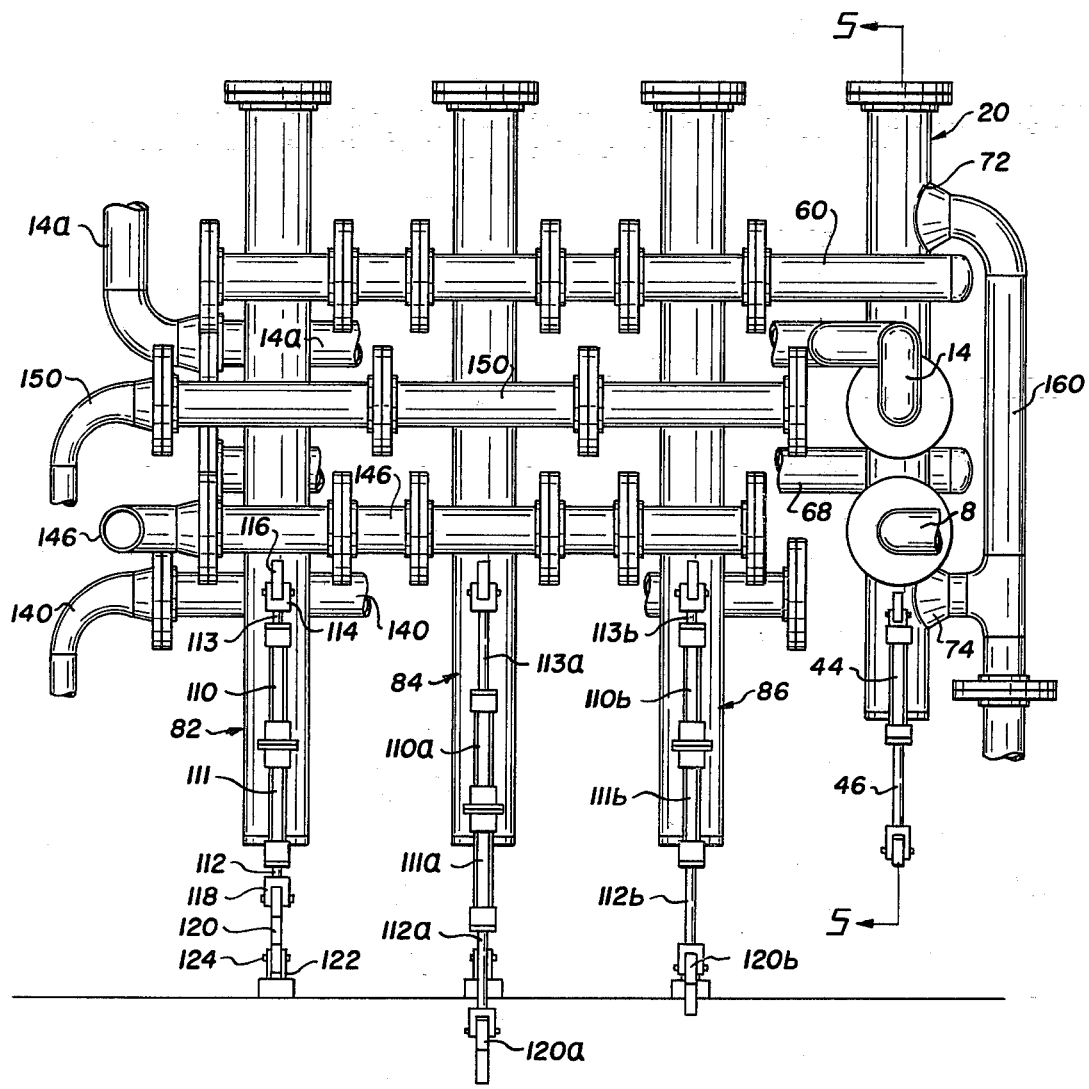
FIG. 4 is a front elevational view of the three position valves, the two position valve and the gas manifolds.

As may be seen in FIGS. 3 and 4, cylinders 110 and 111 are operatively connected to rod 108 by means of lever 120 to move stem 98 to each of three positions. In FIG. 4, the parts of valves 84 and 86 are numbered the same as the parts of the valve 82 with the additional designations "a" and "b" respectively. The first position is the position of valve 86 in FIG. 4 when the corresponding molecular sieve assembly 80 is on the heating mode. In the first position, rod 112b is extended from cylinder 111b. The second position, when top end 130 of stem 98 is adjacent flange 90, corresponds to the position of valve 82 in FIGS. 3 and 4 when the corresponding molecular sieve assembly 76 is on the cooling mode. In the second position, the rods 113 and 112 are retracted into the cylinders 110 and 112. The third position, when lower end 106 of stem 98 is adjacent cap 94, is the cleaning position corresponding to the position of valve 84 in FIG. 4 when the corresponding molecular sieve assembly 78 is on the cleaning mode. In the third position, both rods 112a and 113a are extended. The positions of the valves are changed on a cyclic basis, preferably by a suitable timer and automatic controls.

The three position valves also have a plurality of ports spaced along the casing 88. The top molecular sieve assembly inlet port 132 communicates with conduit 134 for valve 82, 134a for valve 84, and 134b for valve 86. The conduits 134 are connected to the top of the molecular sieve assemblies associated with the valves for the intake of gases into the molecular sieve assemblies. The cooling gas port 135 on each valve communicates with cooling gas manifold 60. Heat exchanger port 136 communicates with heat exchanger manifold 14a comprising a part of heat exchanger conduit 14. Input gas port 138 communicates with input gas manifold 140 which is connected to conduit 2. Heated gas port 142 communicates with heated gas manifold 68. Venting port 144 communicates with venting manifold 146. Purified gas port 148 communicates with purified gas manifold 150. Lastly, molecular sieve assembly outlet port 161 communicates with conduits 162, 162a and 162b for valves 82, 84 and 86 respectively. Conduits 162 are connected to the bottoms of the molecular sieve assemblies associated with the valves for the outlet of gases from the sieve assemblies.

Figure 1C:
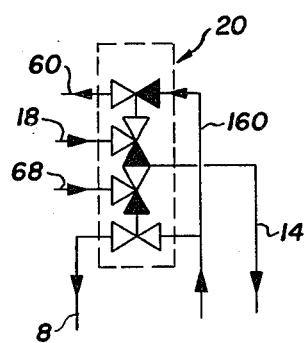
FIG. 1c is a schematic diagram showing the second position of the two position valve shown in FIG. 1b.

Referring to FIGS. 1b and 1d, it may be seen that purified gas manifold 150 is connected to conduit 152 and to intake port 154 of separation tower 156. Separation tower 156 has a tower gas port 158 connected to tower gas conduit 160 for a waste tower gas containing air and natural gas. As mentioned, conduit 160 is connected to the first and second tower gas ports 72 and 74 of two position valve 20 as seen in FIG. 4, FIG. 1b, and FIG. 1c.

During the operation of the cleaning unit shown in FIGS. 1b, 2, 3, 4 and 5, pressurized air is supplied by the fan 16. After passing through the fan conduit 18 and the accumulator 18a forming a part thereof, the pressurized air enters fan port 62 of two position valve 20. For the position of valve 20 shown in solid lines in FIG. 5 and in FIG. 1b, the pressurized air from port 62 passes into the space between stem 24 and casing 22 and between seals 38b and 38c to enter apertures 56c. The pressurized air passes downwardly through the stem 24 between bulkheads 40a and 40b and then through apertures 56d and the space between seals 38c and 38d to exit valve 20 through heat exchanger port 64. The air passes through conduit 14 to heat exchanger 12 where it is heated by the exhaust gases of motor 6 carried to heat exchanger 12 by conduit 10. The heated air then enters manifold 14a.

For the position of the three position valves 82, 84, and 86 as illustrated, valve 86 and molecular sieve assembly 80 are on the heating mode. The hot air from manifold 14a enters valve 86 through port 136 to the space between seals 102b and 102c to aperture 100a. The heated air then flows upwardly through the stem above bulkhead 104 and out of top end 130 to enter molecular sieve assembly inlet port 132. From port 132, the heated air passes through conduit 134b to the top of sieve assembly 80. During the previous mode of operation, sieve assembly 80 was on the cleaning mode and impurities where accumulated in the sieve assembly. During the heating mode, the hot air passes through the sieve assembly to regenerate the sieve assembly and purge it of accumulated impurities.

After passing through sieve assembly 80, the hot air with accumulated impurities, leaves through conduit 162b connected to the bottom thereof and enters valve 86 through sieve assembly outlet port 161. The gas passes into the portion of stem 98 below bulkhead 104 through apertures 100c and flows upwardly to exit through apertures 100b, the space between seals 102e and 102f and through port 144 into venting manifold 146. The heated air containing accumulated impurities is discharged through a suitable outlet, preferably in the roof the apparatus.

Also in the position of valve 20 shown in FIG. 1b, tower gas from conduit 160 enters valve 20 through port 72. From port 72, the gas enters the portion of stem 24 above bulkhead 40a through apertures 56a and flows downwardly to exit through apertures 56b, the space between seals 38a and 38b and port 58. From port 58, the cool gas flows into cooling gas manifold 60.

For the position of the three position valves shown in FIG. 1b, valve 82 is on the cooling mode. The cool gas from manifold 60 enters valve 82 through port 135. From port 135, the gas enters the portion of stem 98 above bulkhead 104 through the space between seals 102a and 102b and apertures 100a. The cool gas flows upwardly and exits through the top 130 of stem 98, port 132 and conduit 134. The cool gas flows downwardly through molecular sieve assembly 76, which was on the heating mode during the last cycle of operation. This cool gas should only be used when sieve 76 is cooled below 400° F. to avoid catalytic burning of the natural gas and air in the cooling gas. Above 400° F., air is used to cool the molecular sieve assemblies as described below for the second position of two position valve 20 shown in FIG. 1c.

After cooling molecular sieve assembly 76, the tower gas passes through conduit 162 to enter valve 82 again through port 161. From port 161, the gas enters the portion of stem 98 below bulkhead 104 through apertures 100c and flows upwardly to exit through apertures 100b, the space between seals 102d and 102e and port 142. From port 142, the gas enters heated gas manifold 68 and flows towards two position valve 20.

The heated tower gas enters stem 24 of valve 20 through port 66, the space between seals 38d and 38e, apertures 56e and flows downwardly through the portion of stem 24 between bulkheads 40b and 40c to exit through apertures 56f, the space between seals 38e and 38f and port 70. From port 70, the gas enters fuel conduit 8 to provide fuel for compressor motors such as motor 6.

For both positions of valve 20 as shown in FIG. 1b and FIG. 1c, the input mine gas from conduit 2, compressor 3 and aftercoolers 4a and 4b enters input gas manifold 140. From manifold 140, the input gas flows into the three position valve of the molecular sieve assembly on the cleaning cycle, in this case three position valve 84 and molecular sieve assembly 78. The input gas enters valve 84 through port 138. From port 138, the gas flows into the portion of stem 98 above bulkhead 104 through the space between seals 102c and 102d and apertures 100a. The input gas flows upwardly through the stem to exit through end 130 of the stem and port 132 into conduit 134a. The input gas passes through molecular sieve assembly 78 where it is purified by the molecular sieve medium inside the sieve assembly.

After passing through sieve assembly 78, the purified gas flows through conduit 162a to enter valve 84 through port 161. The gas enters the portion of stem 98 below bulkhead 104 through apertures 100c and flow upwardly to exit through apertures 100b, the space between seals 102f and 102g and port 148. From port 148, the gas flow through purified gas manifold 150 to conduit 152 and separation tower 156.

As mentioned above, providing tower gas from separation tower 156 for cooling the sieve assemblies is only suitable when the sieve assemblies are at a temperature below 400° F. When the temperature of the molecular sieve assembly being cooled is above 400° F., as occurs at the beginning of the cooling mode, valve 20 is moved to the second position shown in FIG. 1c and in broken lines in FIG. 5. This is accomplished by using hydraulic cylinder 44 to move piston rod 46, lever 50, rod 30 and stem 24 upwardly until end 54 of the stem is adjacent flange 26 as shown in broken lines in FIG. 5. For this position of valve 20, the pressurized air from fan 16 and conduit 18 still enters valve 20 through port 62. However, in this position, apertures 56d are aligned with port 62 and the cool air flows upwardly because bulkhead 40b is immediately below port 62. The air flows through apertures 56c to exit through the space between seals 38a and 38b to port 58 and cooling gas manifold 60. The cool air flows through manifold 60 to the molecular sieve assembly and valve on the cooling mode. For the apparatus as illustrated, molecular sieve assembly 76 and three position valve 82 are on the cooling mode. As described for the cool tower gas in the first position of valve 20, the cool air passes through valve 82 and conduit 134 to cool molecular sieve assembly 76. After cooling the sieve assembly, the air passes through conduit 162 to enter valve 82 again. As for the tower gas during the first position of valve 20, the air passes from valve 92 to heated gas manifold 68 to enter two position valve 20 through port 66.

When valve 20 is in the second position, apertures 56f are aligned with port 66. The air flows upwardly through stem 24 since bulkhead 40c is below port 66. The air exits through apertures 56e, the space between seals 38c and 38d and port 64 to enter heat exchanger conduit 14. The hot air passes through heat exchanger 12 where it is heated by the exhaust from engine 6. The hot air then enters heat exchanger manifold 14a and provides the hot air for heating molecular sieve assembly 80 in the same way as described for the first portion of valve 20.

In the second position of valve 20 as shown in FIG. 1c and in broken lines in FIG. 5, the tower gas from conduit 160 can enter valve 20 through second tower gas port 74. This is because bulkhead 40c is now above port 70 and an exit is provided for the tower gas through apertures 56h, stem 24, apertures 56g and port 70 to fuel conduit 8. Consequently, when valve 20 is in the second position, the fuel for compressor motor 6 and other compressor motors as described below is supplied directly from the separation tower 156. Cylinder 44 can be activated manually to assume the position of FIG. 1b when a thermometer indicates that the temperature of the sieve assembly on the cooling mode has fallen to 400° F. This is preferably accomplished by suitable automatic controls.

After being compressed to a pressure of approximately 65 psia by stage 3a and to 250 psia by stage 3b of compressor 3, the input mine gas passes through conduit 2 to input gas manifold 140 and is purified by the molecular sieve assembly on the cleaning mode. For the apparatus as shown in the drawings, this is molecular sieve assembly 78. As already described, the purified gas leaves the molecular sieve assemblies through manifold 150 which is connected to conduit 152. As shown in FIG. 1d, the purified gas flows through first and second liquifying heat exchangers 170 and 172 before reaching separation tower 156. Before entering heat exchanger 170, the gas is at a temperature of approximately 80° F. In heat exchanger 170, the gas is cooled by the tower gas in conduit 160 passing from separation tower 156 to two position valve 20 and by the gas flowing from heat exchanger 172 through conduit 174. After passing through heat exchanger 170, the gas passes through heat exchanger 172 where it is further cooled by the liquid gas passing into heat exchanger 172 from conduit 176. Upon leaving heating exchanger 172, the natural gas is at a pressure of approximately 250 psia and a temperature of $-175°$ F. The gas flows to expansion valve 270 and is liquified before flowing to the top of separation tower 156 through port 154.

A portion of the purified gas from manifold 150 is diverted by valve 178 through conduit 180 and passes through coil 181 in the bottom of separation tower 156. This serves to boil off air from the liquified gases in the bottom of the separation tower. After passing through the coil 181, the gas leaves at a pressure of approximately 250 psi and a temperature of approximately $-175°$ F. The gas then passes through conduit 182 where it rejoins the main flow of purified gas between heat exchangers 170 and 172.

The liquid natural gas from liquid gas conduit 176 used to cool the purified natural gas in heat exchangers 170 and 172 is a portion of natural gas operating on an essentially closed circuit. From heat exchanger 170, this natural gas returns through conduit 184 to compressor 186 which has two stages, 186a and 186b as seen in FIG. 1a. After being compressed by the two stages of compressor 186 and being cooled by air in aftercoolers 188 and 190 after the two stages respectively, the gas, joined by the gas returning through conduit 192, enters compressor 194. Compressor 194 has two stages 194a and 194b with aftercoolers 196 and 198 and each stage. Upon leaving aftercooler 198 through conduit 200, the natural gas is at a pressure of approximately 2300 psia and a temperature of approximately 80° F. Compressors 186 and 194 are powered by motors 202 and 204 respectively. These motors are supplied by fuel from fuel conduit 8 described above. Compressor motors 6, 202 and 204 are internal combustion piston engines adapted to operate on a mixture of natural gas and air or, alternatively, they can be gas turbines.

From conduit 200, the gas operating on the closed circuit passes through heat exchanger 206, shown in FIG. 1d, where it is cooled by the gas returning through conduits 192 and 238. From heat exchanger 206, the gas passes through conduit 208 to freon chiller 210, shown in FIG. 1a, which is at a temperature of approximately $-10°$ F. Chiller 210 is maintained at this temperature by the freon circulating in conduit 212 and passing through compressor 214 where it is compressed. Compressor 214 is operated by a motor 216. From compressor 214, the gas in conduit 212 passes through aftercooler 218 where it is cooled by air. The freon then passes through expansion valve 220 and is liquified before passing through chiller 210 where it cools the gas entering through conduit 208 and is heated in the process. The freon then returns to the compressor 214.

From chiller 210, the gas from conduit 208 passes through conduit 222 to a second freon chiller 224.

Chiller 224 is maintained at a temperature of approximately −60° F. by another quantity of freon operating in a closed circuit. The freon in conduit 226 is compressed by compressor 228 powered by a motor 230. The freon in conduit 226 then passes through chiller 210 where it is cooled by the liquified freon circulating through conduit 212. From chiller 210, the freon passes to expansion valve 232 where it is liquified before passing through chiller 224. After passing through chiller 224, the natural gas flows to heat exchanger 234 through conduit 236. In heat exchanger 234, as seen in FIG. 1d, the gas is further cooled by the gas flowing through conduit 238 from float valves 240 and 244 back to input gas conduit 2. In heat exchanger 234, the gas is also cooled by the natural gas returning to compressor 194 through conduit 192.

After heat exchanger 234, the gas passes through conduit 246 to expansion valve 248. The gas is liquified by passing through expansion valve 248 and accumulates in medium pressure pot 250. The gaseous portion of natural gas from pressure pot 250 returns to compressor 194 through conduit 192 as already described. From pressure pot 250, the liquid gas flows through conduits 252 and 254 to float valve 256 and through conduit 258 to conduit 260. Any gas from float valve 256 returns to pressure pot 250 through conduit 262.

From conduit 260, the liquid gas flows through conduit 176 to heat exchangers 172 and 170 and cools the purified gas flowing through conduit 152 as already described. A normally closed bypass line 262 is provided from conduit 260 to conduit 264 between float valve 266 and float valves 240 and 244.

The purified gas flowing through conduit 152 passes through expansion valve 270 into the top of separation tower 156. At this point, it has a pressure of approximately 100 psia and a temperature of approximately −230° F. As mentioned earlier, the gases and air boiled off from the bottom of tower 156 by coil 181 return through conduit 160 to provide fuel for the compressors. Additionally, as described above, this gas cools the molecular sieve assembly on the cooling mode when this sieve assembly is at a temperature below 400° F.

Separation tower 156 is provided with a liquid natural gas product conduit 280 near the bottom thereof. The liquid natural gas passes from conduit 280 into float valve 266. The gaseous portion returns to separation tower 156 through conduit 281 and the liquid portion flows through conduit 264 into the two float valves 240 and 244. The gaseous portion from float valves 240 and 244 flows through conduit 238, through heat exchangers 234 and 206 and back to the input gas conduit 2 as already described. The liquid portion from float valves 240 and 244 flows into storage tank 290 for transfer to a suitable container for transport. A conduit 297, as seen in FIGS. 1d and 1a provides make-up gas for the natural gas flowing through conduit 184 on the closed circuit.

What I claim is:

1. An apparatus for purifying and liquifying an input gas containing natural gas and air, the apparatus comprising:
   a plurality of molecular sieve assemblies operable to clean the gas on a gas cleaning mode and to be regenerated on a heating mode and a cooling mode, a first sieve assembly cleaning the gas while a second sieve assembly is being regenerated;
   means for cyclically changing the modes of the sieve assemblies;
   means for liquifying the natural gas purified by said sieve assemblies and for separating air therefrom;
   means for supplying heated air for heating the sieve assemblies during the heating mode; and
   means for directing cool gas to the sieve assemblies during the cooling mode, the cool gas including the air separated from the purified natural gas during at least a portion of the time the sieve assemblies are in a cooling mode.

2. An apparatus as claimed in claim 1, the means for directing cool gas comprising means for selectively supplying air from the atmosphere or the air separated from the purified natural gas to the sieve assemblies for the cooling thereof.

3. An apparatus as claimed in claim 2, the means for directing cool gas comprising valve means for supplying cool air from the atmosphere for cooling the sieve assemblies when the sieve assemblies are above a temperature generally near 400° F. and for supplying the air separated from the purified natural gas for cooling the sieve assemblies when the sieve assemblies are below said temperature.

4. An apparatus as claimed in claim 3, the valve means comprising a two position valve having a first position for operation above said temperature and a second position for operation below said temperature.

5. An apparatus as claimed in claim 4, the valve comprising:
   a tubular casing;
   a tubular stem slidable within the casing and having a plurality of stem apertures spaced along the stem for permitting the passage of gas;
   seals between the stem and the casing to prevent the leakage of gas therebetween; and
   a plurality of ports spaced along the casing, a cooling gas port communicating with the molecular sieve assemblies for supplying cooling gases during the cooling mode, a fan port communicating with a source of pressurized air and a first tower gas port communicating with a source of purified gas, the cooling gas port communicating through the stem with the first tower gas port in a first position of the valve and the cooling gas port communicating through the stem with the fan port in a second position of the valve.

6. An apparatus as claimed in claim 5, the valve comprising a heated gas port connected to the molecular sieve assemblies for gas heated by the molecular sieve assemblies during the cooling mode and a heat exchanger port connected to the molecular sieve assemblies for supplying heated air to the molecular sieve assemblies during the heating mode, the fan port communicating through the stem with the heat exchanger port in the first valve position and the heated gas port communicating through the stem with the heat exchanger port in the second valve position.

7. The apparatus of claim 1 wherein the means for liquifying comprises:
   at least one compressor powered by a motor fueled by natural gas; and
   a separation tower for separating liquid natural gas and a tower gas containing natural gas and air.

8. An apparatus as claimed in claim 1 wherein the means for cyclically changing comprises a plurality of three position valves, one three position valve being associated with each molecular sieve assembly.

9. An apparatus as claimed in claim 8, wherein each three position valve comprises a tubular casing with a plurality of ports spaced along the casing;

a tubular stem slidable to three positions within the casing, one position for each mode of the sieve assemblies, and having a plurality of stem apertures spaced along the stem for the passage of gas; and seals between the stem and the casing to prevent the leakage of gas therebetween.

10. An apparatus as claimed in claim 9, each said three position valve having a cooling gas port for receiving cool gas to cool the molecular sieve assemblies during the cooling mode, a heat exchanger port for receiving hot air to heat the molecular sieve assemblies during the heating mode, a molecular sieve assembly inlet port communicating with one said molecular sieve assembly for supplying gas to the one molecular sieve assembly, an input gas port for receiving unpurified input gas, a heated gas port for discharging the cooling gas heated by the one molecular sieve assembly during the cooling mode, a molecular sieve assembly outlet port communicating with the one molecular sieve assembly for receiving gas from the molecular sieve assembly, a venting port for venting hot air during the heating mode and a purified gas port for gas purified by the one molecular sieve assembly during the cleaning mode.

11. An apparatus as claimed in claim 10, each three position valve having:

a cleaning position wherein the input gas port communicates through the stem with the molecular sieve assembly inlet port and the molecular sieve assembly outlet port communicates through the stem with the purified gas port;

a heating position wherein the heat exchanger port communicates through the stem with the molecular sieve assembly inlet port and the molecular sieve assembly outlet port communicates through the stem with the venting port; and a cooling position wherein the cooling gas port communicates through the stem with the molecular sieve assembly inlet port and the molecular sieve assembly outlet port communicates through the stem with the heated gas port.

12. An apparatus as claimed in claim 11 wherein the means for supplying hot air and the means for supplying cool gas comprises a two position valve comprising:

a tubular casing;

a tubular stem slidable within the casing and having a plurality of stem apertures spaced along the stem for the passage of gas;

seals between the stem and the casing to prevent the leakage of gas therebetween; and a plurality of ports spaced along the casing, a first port communicating with the molecular sieve assemblies for supplying cooling gas to the molecular sieve assemblies during the cooling mode; a fan port communicating with a source of pressurized air; a first tower gas port communicating with a source of purified gas, a heated gas port communicating with the molecular sieve assemblies for receiving gas heated by the sieve assemblies during the cooling mode, a heat exchanger port communicating with a heat exchanger for supplying heated air to the molecular sieve assemblies during the heating mode, a fuel port communicating with a compressor motor for supplying natural gas to fuel the motor and a second tower gas port communicating with the source of purified gas;

the two position valve having a first position wherein the cooling gas port communicates through the stem with the fan port, the heated gas port communicates through the stem with the heat exchanger port and the second tower gas port communicates through the stem with the fuel port;

the two position valve having a second position wherein the first tower gas port communicates through the stem with the cooling gas port, the fan port communicates through the stem with the heat exchanger port and the heated gas port communicates through the stem with the fuel port.

13. An apparatus as claimed in claim 12, the cooling gas port of the two position valve communicating with the cooling gas ports of the three position valves and the heated gas ports of the three position valves communicating with the heated gas port of the two position valve.

14. An apparatus for purifying an input gas containing natural gas and air, the apparatus comprising:

a plurality of molecular sieve assemblies operable to clean the gas on a gas cleaning mode and to be regenerated on a heating mode and a cooling mode, a first sieve assembly cleaning the gas while a second sieve assembly is being regenerated;

means for cyclically changing the modes of the sieve assemblies;

means for supplying hot air for heating the sieve assemblies during the heating mode and means for selectively supplying air or a mixture of purified natural gas and air for cooling the sieve assemblies during the cooling mode;

valve means comprising a two position valve having a first position for operation above a predetermined temperature and a second position for operation below a predetermined temperature, the valve comprising:

a tubular casing;

a tubular stem slidable within the casing and having a plurality of stem apertures spaced along the stem for permitting the passage of gas;

seals between the stem and the casing to prevent the leakage of gas therebetween;

a plurality of ports spaced along the casing, a cooling gas port communicating with the molecular sieve assemblies for supplying cooling gases during the cooling mode, a fan port communicating with a source of pressurized air and a first tower gas port communicating with a source of purified gas, the cooling gas port communicating through the stem with the first tower gas port in a first position of the valve and the cooling gas port communicating through the stem with the fan port in a second position of the valve, a heated gas port connected to the molecular sieve assemblies for gas heated by the molecular sieve assemblies during the cooling mode, a heat exchanger port connected to the molecular sieve assemblies for supplying heated air to the molecular sieve assemblies during the heating mode, the fan port communicating through the stem with the heat exchanger port in the first valve position and the heated gas port communicating through the stem with the heat exchanger port in the second valve position, a fuel port communicating with a compressor motor for fueling the motor with natural gas, and a second tower gas port communicating with the source of purified natural gas, the heated gas port communicating through the stem with the fuel port in the first valve position and the second tower gas port communicating with the fuel port in the second valve position.

15. The apparatus of claim 14, wherein the apparatus further comprises:
at least one compressor powered by a motor connected to the fuel port of the two position valve for supplying natural gas to fuel the motor; and
a cold box comprising a separation tower for separating liquid natural gas and a tower gas containing natural gas and air and having a tower port for the tower gas.

16. An apparatus as claimed in claim 15, the tower port communicating with the first and second tower gas ports of the two position valve.

17. An apparatus as claimed in claim 14 or claim 11, the stem of each valve comprising at least one bulkhead to permit a plurality of separate gas flows between two said ports through the stem apertures and the stem.

18. An apparatus for purifying and liquifying an input gas containing natural gas and air, the apparatus comprising:
a plurality of molecular sieve assemblies operable to clean the gas on a gas cleaning mode and to be regenerated on a heating mode and a cooling mode, a first sieve assembly cleaning the gas while a second sieve assembly is being regenerated;
a plurality of three position valves for cyclically changing the modes of the sieve assemblies, one three position valve being associated with each molecular sieve assembly;
means for supplying hot air for heating the sieve assemblies during the heating mode and means for cooling the sieve assemblies during the cooling mode;
each three position valve comprising a tubular casing with a plurality of ports spaced along the casing, a tubular stem slidable to three positions within the casing, one position for each mode of the sieve assemblies, and having a plurality of stem apertures spaced along the stem for the passage of gas, and seals between the stem and the casing to prevent the leakage of gas therebetween, each said three position valve having a cooling gas port for receiving cool gas to cool the molecular sieve assemblies during the cooling mode, a heat exchanger port for receiving hot air to heat the molecular sieve assemblies during the heating mode, a molecular sieve assembly inlet port communicating with one said molecular sieve assembly for supplying gas to the one molecular sieve assembly, an input gas port for receiving unpurified input gas, a heated gas port for discharging the cooling gas heated by the one molecular sieve assembly during the cooling mode, a molecular sieve assembly outlet port communicating with the one molecular sieve assembly for receiving gas from the molecular sieve assembly, a venting port for venting hot air during the heating mode and a purified gas port for gas purified by the one molecular sieve assembly during the cleaning mode, each three position valve further having a cleaning position wherein the input gas port communicates through the stem with the molecular sieve assembly inlet port and the molecular sieve assembly outlet port communicates through the stem with the purified gas port, a heating position wherein the heat exchanger port communicates through the stem with the molecular sieve assembly inlet port and the molecular sieve assembly outlet port communicates through the stem with the venting port, and a cooling position wherein the cooling gas port communicates through the stem with the molecular sieve assembly inlet port and the molecular sieve assembly outlet port communicates through the stem with the heated gas port;
the means for supplying hot air and the means for supplying cool gas comprising a two position valve including:
a tubular casing;
a tubular stem slidable within the casing and having a plurality of stem apertures spaced along the stem for the passage of gas;
seals between the stem and the casing to prevent the leakage of gas therebetween; and
a plurality of ports spaced along the casing, a first port communicating with the molecular sieve assemblies for supplying cooling gas to the molecular sieve assemblies during the cooling mode; a fan port communicating with a source of pressurized air; a first tower gas port communicating with a source of purified gas, a heated gas port communicating with the molecular sieve assemblies for receiving gas heated by the sieve assemblies during the cooling mode, a heat exchanger port communicating with a heat exchanger for supplying heated air to the molecular sieve assemblies during the heating mode, a fuel port communicating with a compressor motor for supplying natural gas to fuel the motor and a second tower gas port communicating with the source of purified gas;
the two position valve having a first position wherein the cooling gas port communicates through the stem with the fan port, the heated gas port communicates through the stem with the heat exchanger port and the second tower gas port communicates through the stem with the fuel port;
the two position valve having a second position wherein the first tower gas port communicates through the stem with the cooling gas port, the fan port communicates through the stem with the heat exchanger port and the heated gas port communicates through the stem with the fuel port;
the cooling gas port of the two position valve communicating with the cooling gas ports of the three position valves and the heated gas ports of the three position valves communicating with the heated gas port of the two position valve;
and liquifying means for liquifying gas purified by the molecular sieve assemblies and for separating air from the purified gas, said liquifying means comprising:
at least one compressor powered by a motor fueled by natural gas; and
a separation tower for separating liquid natural gas and a tower gas containing air and natural gas, the tower having a tower gas port for the tower gas.

19. An apparatus as claimed in claim 18, wherein the fuel port of the two position valve is connected to the compressor motors for supplying fuel to the motors and the tower gas port of the separation tower is connected to the first and second tower gas ports of the two position valve.

20. An apparatus as claimed in claim 19, comprising:

a cooling gas manifold connected to the cooling gas ports of the three position valves and to the cooling gas port of the two position valve;

an exhaust gas heat exchanger connected to the heat exchanger port of the two position valve and to the heat exchanger ports of the three position valves to heat air with exhaust gases of the compressor motors for heating the molecular sieve assemblies during the heating mode;

a heat exchanger manifold connected to the exhaust gas heat exchanger and to the heat exchanger ports of the three position valves;

an input gas manifold for unpurified gases connected to the input gas ports of the three position valves;

a heated gas manifold connected to the heated gas ports of the three position valves and to the heated gas port of the two position valve;

a venting manifold connected to the venting ports of the three position valves for venting hot air; and a purified gas manifold connected to the purified gas ports of the three position valves for supplying purified gas to the apparatus for liquifying.

21. An apparatus for purifying and liquifying an input gas containing natural gas and air, the apparatus comprising:

a plurality of molecular sieve assemblies operable to clean the gas on a gas cleaning mode and to be regenerated on a heating mode and a cooling mode, a first sieve assembly cleaning the gas while a second sieve assembly is being regenerated;

means for cyclically changing the modes of the sieve assemblies;

means for supplying hot air for heating the sieve assemblies during the heating mode and means for supplying cool gas for cooling the sieve assemblies during the cooling mode;

means for liquifying the purified natural gas comprising at least one compressor powered by a motor fueled by natural gas, and a separation tower for separating liquid natural gas and a tower gas containing natural gas and air;

an exhaust gas heat exchanger for heating air with exhaust gases from the compressor motors to heat the molecular sieve assemblies during the heating mode; and a fan for supplying pressurized air.

22. An apparatus as claimed in claim 21, the means for supplying hot air and the means for supplying cool air comprising valve means having two modes of operation; a first mode for cooling the molecular sieve assemblies at temperatures above a temperature generally near 400° F. with pressurized air from the fan and a second mode for cooling the molecular sieve assemblies at temperatures below said temperature with tower gas from the separation tower, the apparatus comprising:

a tower gas conduit connected to the separation tower;

a fan conduit connected to the fan;

a heat exchanger conduit connected to the exhaust gas exchanger for supplying air to be heated and connected from the exhaust gas heat exchanger to the molecular sieve assemblies for supplying hot air during the heating mode;

a fuel conduit connected to the compressor motor for supplying natural gas as fuel;

a cooling gas conduit connected to the molecular sieve assemblies for supplying cool gas to cool the molecular sieve assemblies during the cooling mode; and a heated gas conduit connected to the molecular sieve assemblies for gases heated by the molecular sieve assemblies during the cooling mode;

during the first mode of operation, the valve means connecting the fan conduit to the heat exchanger conduit, connecting the heated gas conduit to the fuel conduit and connecting the tower gas conduit to the cooling gas conduit; and during the second mode of operation, the valve means connecting the cooling gas conduit to the fan conduit, connecting the heat exchanger conduit to the heated gas conduit and connecting the tower gas conduit to the fuel conduit.

23. An apparatus as claimed in claim 22, the valve means comprising a two position valve with a position for each of the modes of operation.

24. An apparatus as claimed in claim 22, comprising a purified gas conduit connecting the molecular sieve assemblies to the separation tower for gas purified by the sieve assemblies during the cleaning mode of each molecular sieve assembly.

25. An apparatus as claimed in claim 24, comprising at least one liquifying heat exchanger connected to the purified gas conduit for liquifying the purified gas.

26. An apparatus as claimed in claim 25, comprising a liquid gas conduit connected to the liquifying heat exchangers for supplying liquid natural gas to liquify the purified gas.

27. An apparatus as claimed in claim 26 comprising at least one said compressor and a freon chiller connected to the liquid gas conduit to liquifying natural gas for cooling the purified gas.

28. An apparatus as claimed in claim 27 comprising a product conduit connected near the bottom of the separation tower for withdrawing liquid natural gas from the tower.

29. An apparatus as claimed in claim 28 comprising an input gas conduit for supplying unpurified gas to the molecular sieve assemblies, at least one said compressor being connected to the input gas conduit for compressing the input gas.

* * * * *

UNITED STATES PATENT AND TRADEMARK OFFICE
CERTIFICATE OF CORRECTION

PATENT NO. : 4,319,900

DATED : March 16, 1982

INVENTOR(S) : Anker Gram

It is certified that error appears in the above—identified patent and that said Letters Patent is hereby corrected as shown below:

Column 3, line 37, change "of" to --by--.

Column 7, line 2, change "flow" to --flows--;

line 5, change "flow" to --flows--;

line 35, change "92" to --82--.

Column 8, line 41, change "and" to --after--.

Column 9, line 55, change "297" to --292--.

Signed and Sealed this

Fifteenth Day of June 1982

[SEAL]

Attest:

Attesting Officer

GERALD J. MOSSINGHOFF

Commissioner of Patents and Trademarks